Figure 1:
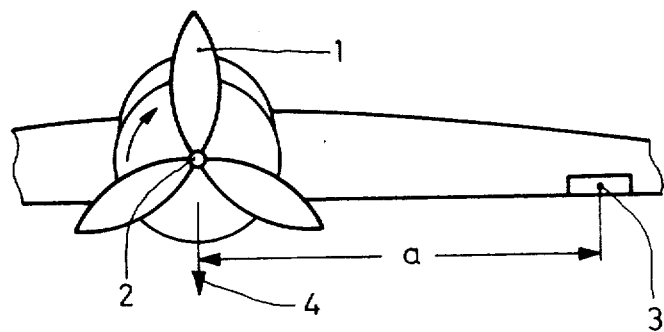

United States Patent
Bschorr

[15] 3,685,610
[45] Aug. 22, 1972

[54] NOISE REDUCTION FOR PROPELLERS

[72] Inventor: Oskar Bschorr, Munich, Germany

[73] Assignee: Messerschmitt-Bolkow-Blohm GmbH

[22] Filed: Feb. 10, 1971

[21] Appl. No.: 114,194

[30] Foreign Application Priority Data

Feb. 26, 1970  Germany..........P 20 09 105.8

[52] U.S. Cl..............181/33 L, 181/33 P, 181/36 D, 181/64 R, 181/64 B
[51] Int. Cl.............................F01n 1/06, F01n 1/18
[58] Field of Search .181/33 R, 33 H, 33 HA, 33 HB, 181/33 L, 33 C, 33 F, 33 P, 33 Q, 33 M, 35 R, 36 D, 64 R, 64 B

[56] References Cited

UNITED STATES PATENTS

| 811,140 | 1/1906 | Garney | 181/33 C |
| 2,043,416 | 6/1936 | Lueg | 181/33 L |
| 2,783,008 | 2/1957 | Bodine | 181/33 L |
| 2,853,852 | 9/1958 | Bodine | 181/33 L |

FOREIGN PATENTS OR APPLICATIONS

| 859,276 | 6/1940 | France | 181/33 L |

*Primary Examiner*—Robert S. Ward, Jr.
*Attorney*—Woodhams, Blanchard and Flynn

[57] ABSTRACT

Method and device for reducing noise produced by propellers. Anti-sound generators (devices reproducing sound vibrations but of inverted phase) are placed in the region of the noise generation but at a spacing therefrom determined by a mathematical relationship such that the zone of noise cancellation will be at the desired zone with respect to the point of noise generation. When the noise suppression is to be through a substantial region, and variable pitch propellers, or other similar variations in the mechanics of noise generation will cause the above-mentioned spacing to vary, multiple units at varying distances from the noise source may be utilized.

14 Claims, 4 Drawing Figures

PATENTED AUG 22 1972  3,685,610

INVENTOR
OSKAR BSCHORR
BY Woodhams, Blanchard & Flynn
ATTORNEYS

NOISE REDUCTION FOR PROPELLERS

The present invention relates to a method and to a device to reduce the noise produced by rotors, especially for ship propellers, helicopter rotors and ventilators.

It is known that to reduce the noise emitted by rotors, the tip velocity of the blades and the surface load should be kept as low as possible. The drawback here is that when the dimensions remain the same, the rotor performance is reduced correspondingly. In the case of power units utilizing propellers, for example, it is possible, by employing such measures, to attain only smaller thrust forces and lower flight speeds.

It is the object of the present invention to reduce the rotor noise in a desired range without adverse effects upon the rotor performance. This problem is essentially solved in that the rotor noise field is cancelled by the super-position of sound fields emitted by anti-sound transmitters which reproduce the noise field with respect to wave geometry and spectral directional distribution, but whose sound fields are of inverted phase with respect to the noise field. The cancellation can be partial or throughout the entire range. With the exception of turbulent vortex noise, rotor noise is periodic and has a period inversely proportional to the rotor rpm and the number of blades. The noise signal is a function of rotor geometry and loading condition. The resultant noise signal is determined by these values and with a knowledge of the phase relationship of the rotor. The anti-sound transmitter is controlled by these input values in order to reproduce an out-of-phase sound signal. The waves emitted by the rotating rotor are spiral-shaped. If rotation is uniform, the in-phase states lie upon spherical Archimedes spiral. If the noise radiated in a certain direction is to be cancelled, for example, downwards in the case of a propeller aircraft, in accordance with the invention, the spiral segments in the direction of cancellation are approximated by osculating phase surfaces. Mathematically, it is a matter here of the known problem of developing phase surfaces and intensity patterns of the rotor noise in the cancellation direction into phase surfaces and intensity patterns of emitters of the n-th order.

For example, in order to obtain optimal conformity in the far field, another feature of the invention, the anti-sound transmitter is attached in the rotor plane, or nearly so, at a distance "a" from the rotor shaft. Distance "a" is expressed as follows, $$a = c/\Omega$$

($\Omega$ = angular velocity of the rotor, $c$ = velocity of sound in the medium in which the rotor is rotating). Vector "a" is at an angle of $3/2\ \pi$ from the cancellation direction, in the sense of propeller rotation. With this arrangement, the wave fronts of the spiral-shaped rotor noise and of the anti-sound transmitter have the same tangent in the cancellation direction, so that in the neighboring range as well, there is still a good interference cancellation.

In order to obtain, for example, in the case of a propeller aircraft, cancellation in the horizontal directions and downwards, distance "a" between the propeller and the anti-sound transmitter is $$d = (\pi c)/(2\Omega)$$

Figure 4:
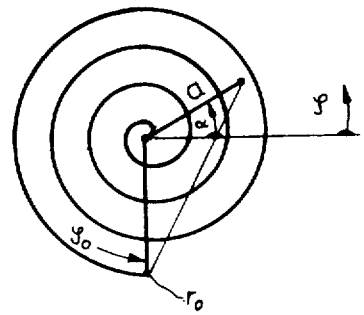

The required position of the anti-sound transmitter may be calculated in accordance with the necessary conditions (FIG. 4).

It is definitely advisable to mount the anti-sound transmitter as near to the rotor as possible. In this way, the distance of travel and thus the attenuation of the rotor noise and anti-sound are as near as possible the same so that maximum inference cancellation results, irrespective of the distance. If, for example, this is not the case in the near range, the intensity of the anti-sound transmitter is laid out so that at the potential distances, the intensities of the rotor and of the anti-sound transmitter are numerically equal.

If the angular range in which an interference cancellation is to operate is to be increased, another feature of the invention provides that several anti-sound transmitters be arranged on an arc with radius "a." For cancellation in all directions, a closed circle with anti-sound transmitters is necessary.

In the usual case, the angular velocity of the rotor is not constant, but varies with operating conditions. In order to obtain in each case the optimum distance "a" of the anti-sound transmitter from the axis of rotation, either the distance is adjusted mechanically or, as provided by a further feature of the invention, two anti-sound transmitters or rings of anti-sound transmitters are mounted at various distances. By varying the strength relationship of the two anti-sound transmitters, any intermediate distance can be produced as a resultant.

While in the case of a fixed rotor, the sound field is rotationally symmetric to the axis of rotation, in azimuth any azimuthal distribution is possible depending upon the type of rotor. In order to verify any given arbitrary azimuthal distribution, the invention provides for the use of two or more anti-sound transmitters in line, essentially located on a parallel to the axis of rotation. By means of a phase shift between the anti-sound transmitters, a given directional distribution can be reproduced. In the general case, the phase shift of the individual harmonics is different.

In the case of variable pitch rotor blades and unsymmetrical air inflow, a general intensity distribution results both in the azimuthal and sagittal directions.

When the location of the anti-sound transmitter is known it must be located so that the difference in travel distance $\Delta r$ is small — it then is a matter of the known task of reproducing the intensity pattern as a superposition of sound transmitters of the zeroth and/or higher orders.

The drawings show the invention by means of several illustrative embodiments.

FIG. 1 Anti-sound transmitter at distance "a."

Figure 2:
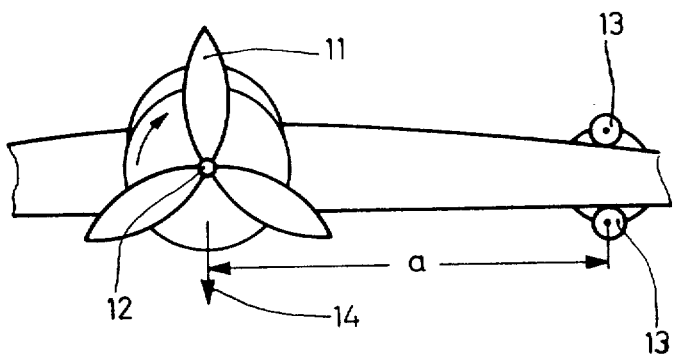

FIG. 2 Several anti-sound transmitters at distance "a."

Figure 3:
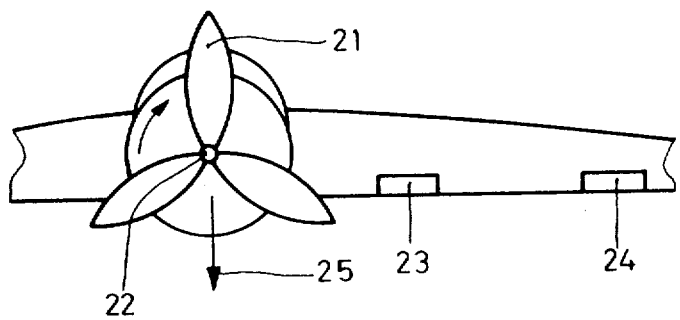

FIG. 3 Anti-sound transmitters at various distances.

FIG. 4 Phase relationships in the propeller plane.

FIG. 1 shows the operation as exemplified by an engine driven propeller. A propeller-rotor 1 rotates about an axis 2. At a distance "a" from axis 2 is an anti-sound transmitter 3. The latter is controlled by the rotor pitch angle so that, with respect to direction 4, it produces an anticyclic sound signal.

FIG. 2; this illustrative embodiment differs from FIG. 1 in that several anti-sound transmitters 13 are located at a distance "a" from the axis of rotation 12 of propeller 11. This produces cancellation in a broader angular range 14.

The distances between the individual anti-sound transmitters must be small with respect to the wavelength. The individual anti-sound transmitters have a phase shift corresponding to the pitch angle.

FIG. 3 depicts an illustrative embodiment that permits selecting of the optimal distance "a" of the anti-sound transmitter from the axis of rotation when the rpm's are varied. Two anti-sound transmitters 23 and 24 are installed at different distances from axis of rotation 22 of rotor 21. By changing the intensity relationship, a desired effective distance can be selected. In place of this "acoustic shift," a mechanical shift of an anti-sound transmitter can also be made.

FIG. 4 shows the phase relationships on the rotor plane. In polar coordinates $(r, \phi)$ with origin at the center of the propeller, the equation of the spiral-shaped phase line is of the form $$r_{spiral} = c/\Omega(\phi) = r_0 + c/\Omega(\Delta\phi)$$

An anti-sound transmitter with coordinates $a, \alpha$ has circular phase lines. In polar coordinates these are of the form $$r_{circle} = \sqrt{r_0^2 - 2r_0 a\cos(\alpha - \phi_0) + a^2\cos^2(\alpha + \phi)} + a\cos(\alpha - \phi)$$

The cancellation is to take place in direction $\phi = \phi_0$. $\Delta\phi$ is the angle measured from $\phi_0$. $r_0$ is an arbitrary distance in the direction of cancellation. The travel difference $\Delta r$ of circle and spiral is $$\Delta r = \sqrt{r_0^2 - 2r_0 a\cos(\alpha - \phi_0) + a^2\cos^2(\alpha - \phi_0 - \Delta\phi)} + a\cos(\alpha - \phi_0 - \Delta\phi) - r_0 - c/\Omega(\Delta\phi)$$

For the far field $(r_0 >> a)$ and cancellation downwards $(\phi_0 = 3/2)$ when $\alpha = 0$, the following results:

$$\Delta r \approx a\sin\Delta\phi - c/\Omega(\Delta\phi)$$

If the wavelengths of the individual harmonics of the rotor noise are $\lambda_n$ $(n = 0; 1; 2; 3)$ and the travel difference $\Delta r$, the maximum attainable local noise reduction $D_n$ for the n-th harmonic is $$D_n = 20 \lg \left| 2 \sin \pi (\Delta r)/(\lambda n) \right|.$$

The embodiments of the invention in which an exclusive property or privilege is claimed are defined as follows:

1. Method for reducing by means of interference the noise of rotors, especially for air craft and ship propellers, helicopter rotors and ventilators, which employs anti-sound transmitters, characterized in that the rotor noise field is cancelled due to the superposition of sound fields emitted by the anti-sound transmitters which reproduce the noise field with respect to wave geometry and spectral directional distribution, but whose sound fields are of inverted phase with respect to the noise field.

2. Device for reducing by means of interference the noise of rotors, especially for aircraft and ship propellers, helicopter rotors and ventilators, characterized in that for reproduction of the rotor noise wave geometry and anti-sound, in a specified direction $(\phi_0)$ and distance $(r_0)$, anti-sound transmitters (3,13) are provided at distance "a" from the rotor axis and at an angle $(\alpha)$ such that the travel difference $(\Delta r)$ of the rotor noise and anti-sound is minimal in the required range in accordance with the equation:

$$\Delta r = \sqrt{r_0^2 - 2r_0 a\cos(\alpha - \phi_0) + a^2\cos^2(\alpha - \phi_0 - \Delta\phi)} + a\cos(\alpha\xi\delta - \phi_0 - \Delta\phi) - r_0 - c/\Omega(\Delta\phi)$$

3. Device according to claim 2, characterized in that the anti-sound transmitters in the case of cancellation downwards $(\phi_0 = 3/2\ \pi)$ are arranged in the rotor plane or near thereto at an angle $\alpha = 0$ and at a distance $$a = c/\Omega.$$

4. Device according to claim 2, characterized in that the anti-sound transmitters in the case of cancellation downwards $(\phi_0 = 3/2\ \pi)$ and in the horizontal direction $(\phi_0 = 0$ and $\phi_0 = \pi)$ are arranged at an angle $\alpha = 0$ and at a distance $a = \pi/2 \cdot c/\Omega$.

5. Device in accordance with claim 2, characterized in that for the purpose of increasing the angular range throughout which the cancellation is to occur, several anti-sound transmitters adjacent to each other are attached in an arc of radius (a) from the axis of rotation, in or near the rotor plane, such anti-sound transmitters having a phase shift in accordance with the angular offset.

6. Device in accordance with claim 2, characterized in that for all-around cancellation anti-sound transmitters are attached in an arc at a distance (a) about the rotor axis, in or near the rotor plane, such anti-sound transmitters having a phase shift in accordance with the angular offset.

7. Device in accordance with claim 2, characterized in that for continuous adaptation of the optimal distance (a) to varying rmp's, anti-sound transmitters are attached at various distances from the axis of rotation so that the intensity relationship of the anti-sound transmitters causes the desired resultant distance to be selected.

8. Device in accordance with claim 2, characterized in that for continuous adaptation of the optimal distance (a) to the varying rmp's, the anti-sound transmitter(s) is (are) mechanically displaced.

9. Device in accordance with claim 2, characterized in that, for verification of the azimuthal directional distribution, two or more anti-sound transmitters are provided, one behind the other, essentially on a line parallel to the axis of rotation, the mutual distances and phase shifts being coordinated in the known way employed in antenna engineering so that the required directional distribution is achieved.

10. Device in accordance with claim 2, characterized in that, for reproduction of a sagittal directional distribution, two or more anti-sound transmitters are in a radial direction and are tuned in the manner employed in antenna engineering so that the required directional distribution is achieved.

11. Device in accordance with claim 2, characterized in that, for reproduction of the azimuthal and sagittal directional distribution, two or more anti-sound transmitters are provided at an angle that lies between a parallel to the axis of rotation and a radial direction in accordance with the azimuthal and sagittal gradients.

12. Device in accordance with claim 2, characterized in that the change in the rotor noise field caused by the change in rpm or load is impressed upon the control system of the anti-sound transmitters and is automatically adjusted to the momentary operating condition.

13. Device in accordance with claim 2, characterized in that a siren operated by compressed air is used as an anti-sound transmitter and the siren disk runs synchronously with the rotor.

14. Device in accordance with claim 2, characterized in that a part of the fuselage skin is constructed as an electrodynamic loud speaker and is used as an anti-sound transmitter.

* * * * *

UNITED STATES PATENT OFFICE
CERTIFICATE OF CORRECTION

Patent No. 3 685 610            Dated    August 22, 1972

Inventor(s) Oskar Bschorr

It is certified that error appears in the above-identified patent and that said Letters Patent are hereby corrected as shown below:

1. Add "Munich Germany" following the name of the Assignee.

2. In Figure 4, change the $\mathcal{T}$ and $\mathcal{T}_0$ representations to $\phi$ and $\phi_0$, respectively.

Signed and sealed this 29th day of May 1973.

(SEAL)
Attest:

EDWARD M. FLETCHER, JR.
Attesting Officer

ROBERT GOTTSCHALK
Commissioner of Patents